Oct. 27, 1953
D. P. SCHWESTER ET AL
2,657,074
METALLIC BELLOWS
Filed Aug. 17, 1950
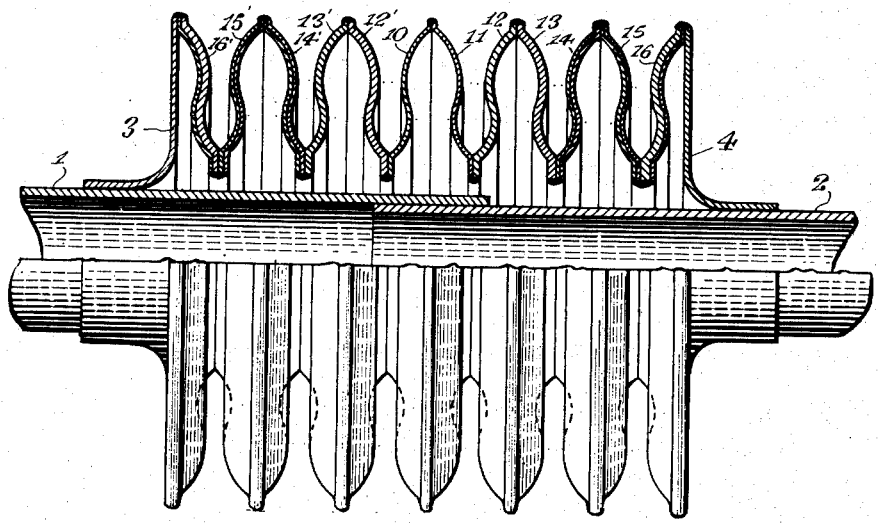
INVENTORS
Daniel P. Schwester &
BY John J. Phillips
Emery Vary Whittemore + Dix
ATTORNEYS Patented Oct. 27, 1953

2,657,074

UNITED STATES PATENT OFFICE 2,657,074

METALLIC BELLOWS

Daniel P. Schwester, East Orange, and John J. Phillips, West Orange, N. J., assignors, by mesne assignments, to Titeflex, Inc., Newark, N. J., a corporation of Massachusetts Application August 17, 1950, Serial No. 179,901

1 Claim. (Cl. 285—90)

The present invention relates to improvements in the construction of bellows of the type which consists of a number of discs, usually annular and suitably shaped in order that each may be joined at its outer edge to a similar disc at one side and at its inner edge to a similar disc on the other side. This type of bellows is well known and widely used for connecting movable parts to provide a fluid-tight expansion joint therebetween.

When such bellows are used to connect parts which move slowly in relation to each other, the bellows may be termed a static bellows, but when the connected parts move rapidly with respect to each other the bellows may be termed a dynamic bellows. It is in connection with the latter type of bellows that difficulties arise which it is the particular object of this invention to overcome and to which this invention particularly relates.

It has been observed that bellows of the dynamic type are apt to develop failures at or near the abutments where the end diaphragms are welded to a flange attached to one of the relatively movable parts, or near such points. This is apparently due to the extra working of the metal at these points because high frequency vibrations of the moving parts tend to concentrate there instead of being uniformly distributed throughout the several members of the whole bellows structure.

It is an object of the present invention to provide a bellows of the dynamic type which will withstand high frequency vibrations and avoid failure at or near the attaching flanges.

It is a further object of the invention to provide a bellows structure in which the flexing of the metal diaphragms will be substantially uniform when subjected to high frequency vibrations.

It is another object of the invention to provide diaphragms of varying degrees of flexibility to the end that when said diaphragms are united into a single bellows structure the relative flexibility thereof shall decrease from the approximate midpoint toward the attached ends.

The invention may find many practical applications one of which, selected for purposes of illustration, is that of providing a flexible fluid-tight seal between two sections of the exhaust conduit of an internal combustion engine. Such an illustrative embodiment of the invention is shown in the accompanying drawing, which is a view of a form of bellows embodying our invention, partly in longitudinal vertical section and partly in elevation.

The single figure of the drawings shows two telescoping pipes 1 and 2 which, for example, may constitute the exhaust conduit of an internal combustion engine. A flange 3 is welded to the pipe 1 and a flange 4 to the pipe 2. Between the flanges a plurality of diaphragms are arranged so that the flanges are connected by a fluid-tight casing which will permit the pipes 1 and 2 to move longitudinally with respect to each other with flexing of the diaphragms.

As shown in the drawing, the several diaphragms are alike in size and shape but different in thickness, being stamped or forged out of suitable sheet metal. In the illustrative embodiment, each diaphragm is an annular disc having a central aperture of uniform diameter and being of the same over-all diameter. The effect of the construction illustrated is to impart a degree of flexibility to the diaphragms at and near the center of the bellows which is higher than that of the diaphragms at or near the attaching flanges, to the end that the stresses due to high frequency vibrations may be distributed with some degree of uniformity over the entire bellows structure and not concentrated, as heretofore, at or near the flanges with consequent failure at the points of stress concentration.

Referring to the drawing it will be observed that the central diaphragm element comprises two diaphragms 10 and 11 of uniform thickness. For example, in a bellows having a central aperture of 2½ inches in diameter and an outside diameter of 3¾ inches, sheet metal of .005 inch in thickness may be used. It will also be observed that the diaphragm elements on each side of the central element, composed of diaphragm elements 12, 13 and 12', 13' are of uniform thickness but greater than that of the diaphragms 10 and 11. For example, sheet metal .0075 inch thick may be used. The next diaphragm elements flanking the central group of three are shown of laminated construction, each of these, namely, 14, 15 and 14', 15' being formed of two layers of sheet metal .005 inch thick for a total thickness of .010 inch. Finally the last diaphragms 16 and 16' at each end of the bellows are also of laminated construction consisting of one layer of .005 inch thick sheet metal with another of .0075 inch for a total thickness of .0125 inch.

It will, of course, be understood that the number of diaphragm elements may be extended to provide a longer bellows, if desired, and that if this is done each diaphragm element will be made progressive less flexible, in the manner above described by using still thicker sheet metal or by laminating as indicated, or by both.

The several diaphragms having been formed and selected as above described, they may be assembled in the following manner.

Ordinarily the assembly will start at one end and progress joint by joint to the other end, although the procedure may be varied as will be later indicated. In any event a suitable assembly jig or fixture will be required to hold the diaphragms in place by engagement with the central aperture while the outer edges are being welded and by engagement with the outer edge while the inner edges are being welded. The first step is to place the flange 3 in the jig, then place the two laminae making up diaphragm 16' therein and weld the outer margins of these two laminae together and to the outer periphery of the flange. The next step is to place the flange and atached diaphragm in another jig, move the two laminae of diaphragm 15' into place and weld together the inner margins of diaphragm 16' and 15' which comprise four thicknesses of metal. The laminae forming a single diaphragm may be spot welded to each other before assembly if desired.

The assembly of the entire bellows may be carried out by repeating in alternation the steps just described in a manner which will be readily understood without further explanation. If desired the procedure may be varied by assembling one-half of the bellows as above described, then assembling the other half and finally joining the two halves by welding together the other edges of diaphragms 10 and 11.

We claim as our invention:

A metallic bellows structure adapted to connect two relatively movable parts to form a flexible and expansible fluid-tight joint therebetween, said bellows structure comprising, in combination, a plurality of connected pairs of dished annular diaphragms of like shape and size welded to each other at their outer margins and to adjacent pairs at their inner margins, the central pair of diaphragms consisting of relatively thin gauge metal and being relatively more flexible than the two pairs adjoining said central pair on either side, the said two adjoining pairs consisting of relatively thicker gauge metal than the central pair and being in turn relatively more flexible than the two connected pairs adjacent thereto on each outer side, the said last mentioned pairs consisting of two laminated layers of metal, each layer corresponding substantially in gauge to that of the first mentioned central pair of diaphragms, and outer end diaphragms consisting of two laminated layers of metal of which one layer substantially corresponds in gauge to that of the central pair and the other layer substantially corresponds in gauge to that of the second mentioned pairs of diaphragms.

DANIEL P. SCHWESTER.
JOHN J. PHILLIPS.

References Cited in the file of this patent

UNITED STATES PATENTS

| Number | Name | Date |
|---|---|---|
| 962,951 | Fulton | June 28, 1910 |
| 979,460 | Fulton | Dec. 27, 1910 |
| 1,191,486 | Tyler | July 18, 1916 |
| 1,345,971 | Star | July 6, 1920 |
| 1,547,341 | Mallory | July 28, 1925 |
| 2,117,219 | Shaw | May 10, 1938 |
| 2,172,612 | Hassenkamm | Sept. 12, 1939 |
| 2,207,146 | Fentress et al. | July 9, 1940 |
| 2,284,354 | Gunn | May 12, 1942 |
| 2,337,266 | Holland | Oct. 23, 1945 |
| 2,470,167 | Hobbs et al. | May 17, 1949 |
| 2,487,410 | Baker | Nov. 8, 1949 |

FOREIGN PATENTS

| Number | Country | Date |
|---|---|---|
| 471,118 | Germany | Feb. 7, 1929 |
| 142,531 | Germany | Dec. 1, 1930 |
| 709,941 | France | Aug. 14, 1931 |
| 721,497 | France | Mar. 3, 1932 |
| 746,015 | France | May 20, 1933 |